Figure 1:
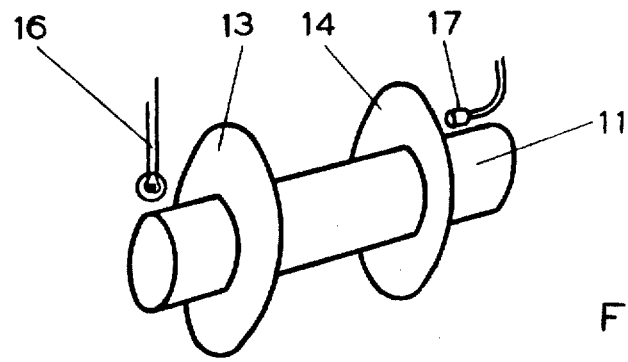

United States Patent

[11] 3,596,100

| [72] | Inventor | Robert William Hollick<br>Yeovil, England |
|---|---|---|
| [21] | Appl. No. | 800,583 |
| [22] | Filed | Feb. 19, 1969 |
| [45] | Patented | July 27, 1971 |
| [73] | Assignee | British Hovercraft Corporation Limited<br>Yeovil, England |
| [32] | Priority | Apr. 8, 1968 |
| [33] | | Great Britain |
| [31] | | 16,779/1968 |

[54] LINEAR OUTPUT TORQUE METER UTILIZING LIGHT SENSING
9 Claims, 4 Drawing Figs.

[52] U.S. Cl. .................................. 250/204,
73/136 A, 250/210, 250/225
[51] Int. Cl. .................................. G01j 1/36
[50] Field of Search .......................... 250/225,
210, 204; 73/136 A

[56] References Cited
UNITED STATES PATENTS
2,206,575 7/1940 Pinco .................. 250/225

| 2,313,923 | 3/1943 | Chubb | 73/136 A |
| 2,938,378 | 5/1960 | Canada et al. | 73/136 A |
| 3,474,255 | 10/1969 | White | 250/225 |
| 3,354,705 | 11/1967 | Dyer | 73/136 A |
| 3,495,452 | 2/1970 | Johnson | 73/136 A |
| 3,510,224 | 5/1970 | Hooper | 250/225 X |

Primary Examiner—Archie R. Borchelt
Assistant Examiner—Charles M. Leedom
Attorney—Larson, Taylor & Hinds

ABSTRACT: An apparatus for measuring torque in either a stationary or rotating shaft. Two light-polarizing screens are mounted on a shaft transmitting a torque in such a manner that the twist in the shaft caused by the torque causes a relative rotatory movement between the screens. Light from a light source passes through the screens to a light-sensing device which produces a signal according to the amount of light it receives. The relative rotatory movement of the screens caused by the applied torque causes a variation in the amount of light passing to the light-sensing device so that the signal produced indicates the amount of torque.

The use of light to measure twist means an absence of drag and hence the ability to measure very small torques.

LINEAR OUTPUT TORQUE METER UTILIZING LIGHT SENSING

This invention relates to devices for measuring torsional loads in shafts and more particularly to torque meters which operate on the principle that angular twist of a solid or hollow shaft is proportional to the applied torque.

Torque meters may consist of strain gage elements bonded to the torque-transmitting shaft so that the resistance of the elements varies as the shaft is stressed. However, shafts transmitting loads from fractional horsepower motors may be so small that the attachment of strain gage elements becomes impracticable. Further, a power supply must be provided to the elements and their output signals collected. Whether this transfer of electric power between a rotating shaft and stationary indicating equipment is achieved by slip rings and brushes or by rotating transformers there is a drag which, when small torques are being measured, may invalidate the signals from the strain gage elements.

Alternatively, the twist in a rotating shaft may be measured by mounting two perforated discs on a shaft and measuring the amount of light passing through the perforations. As the shaft twists the perforations of one disc move in relation to the perforations in the other disc and allow a greater or lesser amount of light to pass, and the amount of light may be used to indicate the torque being transmitted. At low-rotational speeds, however, the passage of light is intermittent, giving unreliable signals, and when the shaft is stationary a random amount of light, depending upon the chance stopping of the shaft at the end of the previous operation, reaches the light sensor.

It is the object of the invention to provide a torque meter which imposes no drag on a shaft and which will measure the torque in a shaft when it is stationary and at all speeds up to its maximum rotational speed.

According to the invention I provide a torque meter including two screens mounted on a shaft so that, when a torque is applied to the shaft there is rotational movement of one screen in relation to the other screen, at least one light source and one light-sensing device arranged so that waves of light moving from said light source to said light-sensing device pass through the screens, means to prevent ambient light reaching said light-sensing device, each of said screens being polarized to confine oscillation of the light waves to a single plane, and means indicating the amount of light received by the first light-sensing device.

From another point of view I provide a torque meter including two screens mounted on a shaft so that, when a torque is applied to the shaft there is a rotational movement of one screen in relation to the other screen, a light source and a light-sensing device arranged so that waves of light moving from said light source to said light-sensing device pass through the screens, and means to prevent ambient light reaching said light-sensing device, wherein each of the two screens is polarized to confine oscillation of the light waves to a single plane and including means to produce a linear output signal according to the amount of light received by said light-sensing device.

The screens may be "Pola" discs or plates of "Polaroid."

The shaft may be waisted or may have coupling means between the supports for the screens to provide adequate relative movement between the screens.

The light-sensing device may be a photoelectric cell which may act as a part of an electrical bridge circuit to produce a signal, and the signal may be arranged to give a linear indication of torque.

The means to prevent the ambient light reaching the light-sensing device may be a hood of material impervious to light surrounding the light source, the screens and the light-sensing device.

Figure 2:
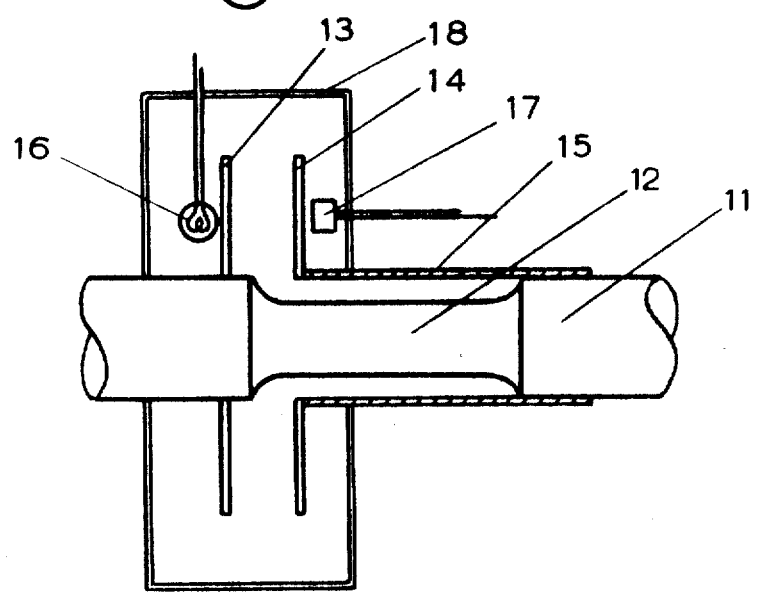
Figure 3:
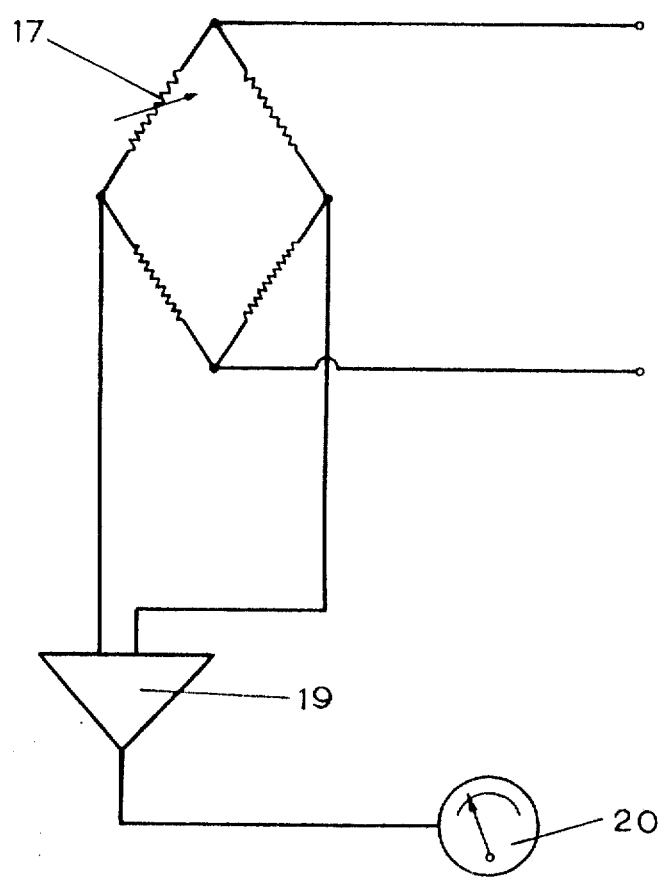
Figure 4:
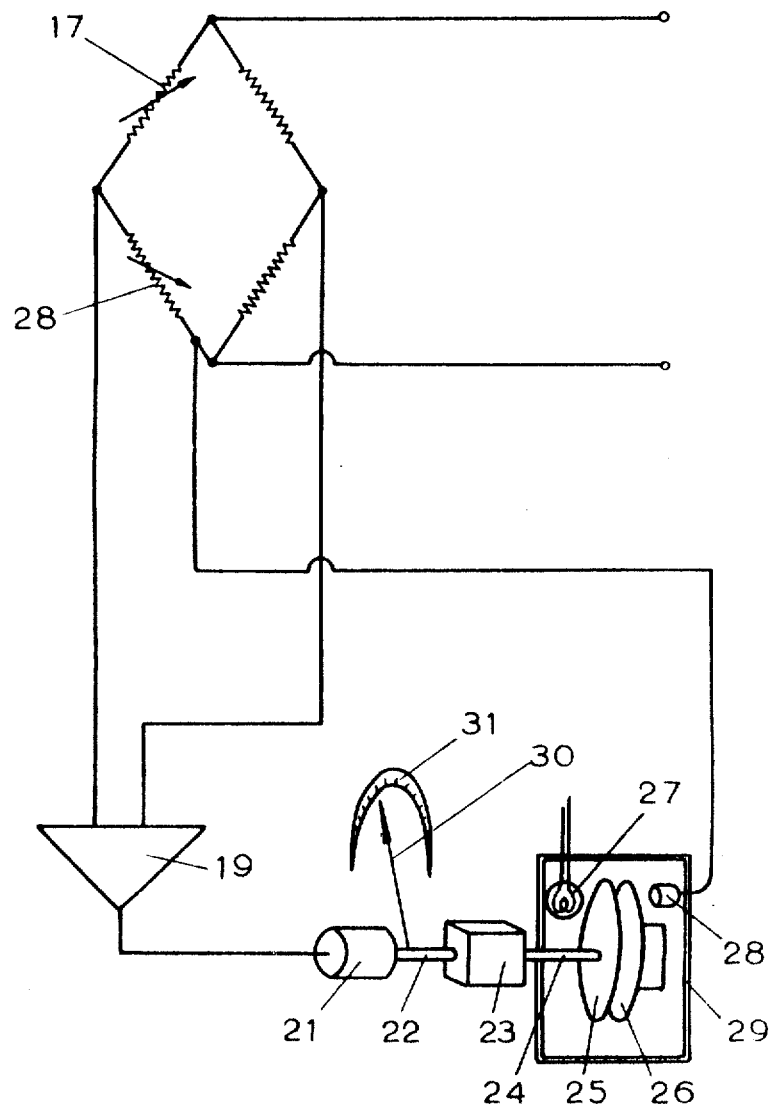

The invention will now be described, by way of example, with reference to the accompanying drawings, in which:

FIG. 1 is a diagrammatic perspective view of a torque meter according to the invention, FIG. 2 is a schematic section of a torque meter according to the invention, FIG. 3 is a basic circuit diagram illustrating the generation of a signal to indicate torque, and FIG. 4 is a diagram indicating how a straight line output signal may be achieved.

A shaft 11 is adapted by means of flanges, splines, or the like (not shown) to transmit a torque from a prime mover to a load. The shaft 11 has a portion of reduced diameter 12 to accentuate the twist caused by the torque. Supported on the shaft 11 at each end of the portion of reduced diameter 12 are light-polarizing screens 13 and 14 of, for example, "Pola" discs or plates of "Polaroid." One of the screens, for example screen 14, may have a supporting cylinder 15 attached to the shaft at one end of the portion of reduced diameter 12, so that the two screens are positioned close together.

A light source 16, and a light-sensing device 17, are arranged so that waves of light moving from the light source 16 to the light-sensing device 17 pass through the polarized screens 13 and 14. The screens 13 and 14, the light source 16 and the light-sensing device 17, are surrounded by a hood 18 of opaque material to exclude ambient light.

The light-sensing device 17 is arranged to form one corner of an electrical bridge circuit (FIG. 3), from which the output may be amplified by an amplifier 19 and fed to an indicator 20.

It is to be understood that trimming and balancing devices are required by the bridge circuit. Such devices are well known and are not shown in the circuit diagram.

Preferably the screens 13 and 14 are arranged so that their polarizing axes are at 90° to each other when no torque is being transmitted.

In operation, when no torque is being transmitted, polarized light passing through one screen is unable to pass through the other screen, and no light reaches the light-sensing device. As soon as torque is applied, irrespective of whether the shaft is stationary or rotating, the shaft twists, and therefore, one screen rotates in relation to the other. This allows an amount of light, depending on the amount of twist in the shaft, to reach the light-sensing device, and the light-sensing device generates a signal which actuates the indicator.

FIG. 4 illustrates a method of providing a linear output signal from a light-sensing device. The output from the bridge circuit, amplified by the amplifier 19, is fed to an electric motor 21. A shaft 22 connected to the electric motor 21 drives, by means of a gearbox 23 and a shaft 24, a rotatable light-polarizing screen 25. Adjacent to the rotatable light-polarizing screen 25, is a stationary light-polarizing screen 26. A second light source 27 and a second light-sensing device 28 are arranged so that waves of light moving from the second light source 27 pass through the rotatable and stationary polarizing screens 25 and 26, to the second light-sensing device 28. The screens 25 and 26, the second light source 27, and the second light-sensing device 28, are surrounded by a hood 29 of opaque material to exclude ambient light.

The second light-sensing device 28 is arranged to form another corner of the hereinbefore-mentioned electrical bridge circuit.

The polarizing screens 25 and 26 should be arranged so that, when no torque is being transmitted, their polarizing axes are in a relationship similar to those of screens 13 and 14.

In operation, a change of torque causes a change of resistance in corner 17 of the bridge circuit. This unbalances the bridge, and a signal, amplified by the amplifier 19, drives the motor 21. The motor 21 drives, by means of shaft 22, gearbox 23 and shaft 24, the rotatable light-polarizing screen 25. Movement of the rotatable light-polarizing screen 25 changes the resistance 28 in the other corner of the bridge circuit, and eventually brings the circuit back into balance. When balance is reached, the output signal to the motor ceases, and the motor stops. When torque is decreasing the bridge is unbalanced in the opposite sense and the motor runs in the opposite direction.

Hence, twist in the torque transmitting shaft results in the running of the motor and a pointer 30 attached to the shaft 22, sweeping over a scale 31, indicates the movement of the motor and, therefore, the torque being transmitted. The gearing in the gearbox may be arranged so that the maximum torque will give a motor movement corresponding to full-scale deflection or any other required movement.

The invention is not to be considered as limited to the examples described herein and illustrated in the drawings. Modifications can be made which are within its scope. For example, the output signal may be used to activate automatic warning or stopping devices, or other forms of indication, such as digital counters, may be used.

Further, the output may be integrated with other measurements to indicate other parameters, for example, the output may be integrated with shaft rotational speed to indicate the power being transmitted.

I claim as my invention:

1. A torque meter comprising first and second light-polarizing screens each polarized to confine light oscillations falling thereon to a single plane; a shaft; means for mounting said screens on said shaft so that a relative rotational movement between said first and second screens is produced upon application of a torque to said shaft; at least one light source; at least one light-sensing device for receiving light emitted by said source after the passage of said light through said screens; means for preventing ambient light from reaching said light-sensing device; an electrical bridge circuit, said light-sensing device comprising a first light-sensitive transducer connected in one arm of said bridge circuit; amplifier means for amplifying the output of said bridge circuit; a rotatable light-polarizing screen; an electrical motor connected to the output of said amplifier means for driving said rotatable screen; a fixed polarizing screen; a second light source; a second light-sensing device for receiving light passing through said rotatable screen and said fixed screen, said second light-sensing device comprising a second light-sensitive transducer connected in a further arm of said bridge circuit; and indicating means driven by said electric motor.

2. A torque meter as claimed in claim 1 wherein said shaft includes a portion of reduced diameter between the supports for the screens.

3. A torque meter as claimed in claim 1 wherein the means for preventing ambient light from reaching said first light-sensing device comprises a hood of material impervious to light surrounding said light source, said first and second screens and said first light-sensing device.

4. A torque meter as claimed in claim 2 wherein one of said first and second screens is supported upon a cylinder attached to the shaft at one end of the portion of the reduced diameter.

5. A torque meter as claimed in claim 4 wherein the polarizing axis of one of said first and second screens is at 90° to the polarizing axis of the other of said screens when no torque is being transmitted.

6. A torque meter as claimed in claim 4 further comprising amplifier means for amplifying the output from the electrical bridge circuit, and an automatic warning device actuated responsive to the output of said amplifier means.

7. A torque meter as claimed in claim 4 further comprising amplifying means for amplifying the output of said electrical bridge circuit and an automatic stopping device actuated responsive to the output of said amplifier means.

8. A torque meter as claimed in claim 4 further comprising amplifier means for amplifying the output of said electrical bridge circuit and a digital counter operated responsive to the output of said amplifier means.

9. A torque meter as claimed in claim 6 wherein said output is integrated with other measurements to indicate other parameters.